United States Patent Office 3,448,110
Patented June 3, 1969

---

3,448,110
DERIVATIVES OF ISOBUTYRIC ACID
Rudolf G. Griot, Florham Park, N.J., assignor to Sandoz Inc., Hanover, N.J.
No Drawing. Filed Oct. 3, 1966, Ser. No. 583,975
Int. Cl. C07d 29/24, 29/18; A61k 27/00
U.S. Cl. 260—294.3
4 Claims

ABSTRACT OF THE DISCLOSURE

α-(p-Chlorophenoxy)isobutyric acid 1-lower alkyl-4-piperidyl esters and non-toxic acid addition salts thereof, e.g., α - (p - chlorophenoxy)isobutyric acid 1-methyl-4-piperidyl ester hydrochloride, are useful as hypocholesteremic/hypolipemic agents.

---

This invention relates to derivatives of isobutryric acid. In particular, the invention pertains to basic esters of α-(p-chlorophenoxy)isobutyric acid and the use thereof as hypolipemic (hypocholesteremic) agents.

The compounds of the present invention may be represented structurally as follows:

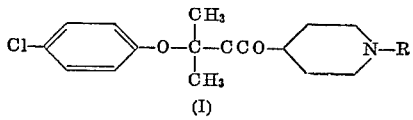

(I)

wherein R represents lower alkyl preferably containing from 1 to 4 carbon atoms, e.g., methyl, ethyl, propyl and butyl.

The compounds of structural Formula I are readily prepared by converting α-(p-chlorophenoxy)isobutyric acid to its corresponding acid halide and reacting the latter with an appropriate alcohol or alcoholate. This process is illustrated by the following reaction scheme.

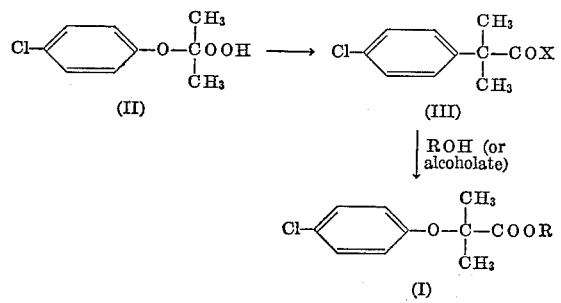

wherein R is as previously defined, and X represents halogen, preferably chloro or bromo.

In the above process, the α-(p-chlorophenoxy)isobutyric acid (II) is converted to the corresponding acid halide (III) by reaction with thionyl chloride or other suitable agent commonly used for this purpose, e.g., thionyl bromide, phosphorus pentachloride and phosphorus pentabromide. The reaction is conveniently carried out in a suitable inert organic solvent and at room temperature (20° C.) or elevated temperatures up to the reflux temperature of the system. However, the use of a solvent is not necessary since an excess of the halide reagent can be employed for this purpose. It is generally preferred to carry out the reaction in the presence of a catalytic amount of dimethylformamide. The reaction of the thus-obtained acid halide (III) with the appropriate alcohol or alcoholate is conveniently effected in a suitable inert organic solvent, e.g., benzene, toluene, chloroform, diethyl ether and at room temperature (20° C.) or below. The reaction, if desired, can be carried out at elevated temperatures; however, in such instances external cooling should be provided since the reaction is exothermic. Preferably, the reaction is carried out at a temperature of from about −10° to about 5° C. Where the free alcohol is employed, it is desirable to provide a means for taking up a liberated hydrogen halide. This can be accomplished by employing an excess of the alcohol or by carrying out the reaction in the presence of an alkali metal carbonate, e.g., potassium carbonate, or suitable inert base, e.g., pyridine. Where an alcoholate is used, the alkali metal salts, particularly the sodium and potassium salts are preferred. The desired product thus obtaned is readily recovered in conventional manner.

The compounds of the present invention (Formula I) are useful because they possess pharmacological activity. In particular, the compounds possess hypocholesteremic activity and can be used as hypocholesteremic/hypolemic agents.

For such usage, the compounds may be admixed with conventional pharmaceutical carriers and administered orally in similar manner to that described in U.S. Patent 3,262,850. Furthermore, the compounds may be similarly administered in the form of a non-toxic, pharmaceutically-acceptable acid addition salt thereof. Such salts do not materially differ from the free base in their pharmacological effects and are included within the scope of the invention. The salts are readily prepared by reacting the base with pharmacologically-acceptable acids in conventional manner. Representative of such salts are the mineral acid salts, such as the hydrochloride, hydrobromide, sulfate, phosphate, and the like and the organic acid salts such as the benzoate, acetate, maleate, p-toluenesulfonate, benzenesulfonate and the like.

For the above-mentioned use the dosage administered will, of course, vary depending on the compound employed. However, in general, satisfactory results are obtained when administered at a daily dosage of from about 0.5 gram to about 2 grams, preferably given in divided doses of about 125 milligrams to about 1000 milligrams, two to four times a day or in sustained release form. A representative formulation suitable for oral administration is a tablet (prepared by standard tabletting techniques) and containing, by weight, 50 parts of α-(p-chlorophenoxy)isobutyric acid, 1-methyl-4-piperidyl ester hydrochloride, 2 parts of tragacanth, 39.5 parts of lactose, 5 parts of corn starch, 3 parts of talcum and 0.5 part of magnesium stearate.

The following examples show representative compounds contemplated by the present invention and the manner in which said compounds are made. However, it is to be understood that the examples are intended for purposes of illustration only and are not intended as in any way limiting the scope of the invention which is defined in the appended claims.

EXAMPLE 1

α-(p-Chlorophenoxy)isobutyric acid 1-methyl-4-piperidyl ester

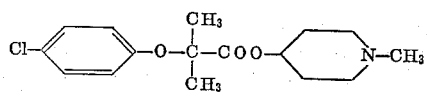

Step (A): Preparation of α-(p-chlorophenoxy)isobutyric acid chloride.—A mixture of 107.25 g. (0.5 mole) of α-(p-chlorophenoxy)isobutryric acid, 500 ml. of anhydrous diethyl ether, 3 ml. of dimethylformamide and 163.8 g. (1.38 mole) of thionyl chloride is refluxed (under a nitrogen atmosphere) on a water bath for 4 hours. The resulting mixture is evaporated on a rotary evaporator at 40° C. to remove the solvent and excess thionyl chloride, and the residue then diluted with 300 ml. of carbon tetrachloride. The mixture thus obtained is dried over magnesium sulfate and evaporated. The residue is distilled to obtain α-(p-chlorophenoxy)isobutyric acid chloride, B.P. 80° C. at 0.0075 mm.

Step (B): Preparation of α-(p-chlorophenoxy)isobutyric acid 1-methyl-4-piperidyl ester.—A mixture of 11.4 g. (0.1 mole) of 1-methyl-4-hydroxypiperidine, 100 ml. of toluene and 10.1 g. of triethylamine is cooled to about 0° C. in an ice-salt bath. To the cooled mixture is then added dropwise with stirring a solution of 23.3 g. (0.1 mole) of α-(p-chlorophenoxy)isobutyric acid chloride in 30 ml. of toluene, while maintaining the temperature of the reaction mixture between 0° and 10° C. with external cooling. After the addition is completed, the mixture is stirred for an additional 30 minutes at room temperature and then filtered. The filtrate is extracted with 100 ml. of ice-cold sodium bicarbonate solution (10%). The organic phase is washed twice with 50 ml. (each) of water, then dried over magnesium sulfate and evaporated. The residue thus obtained is diluted with 40 ml. of isopropanol, and the resulting mixture acidified with isopropanolic hydrogen chloride. After precipitation of the hydrochloride salt, anhydrous diethyl ether is added, the mixture filtered and the residue recrystallized from a mixture of 100 ml. of isopropanol and 30 ml. of ethanol to obtain α-(p-chlorophenoxy)isobutyric acid 1-methyl-4-piperidyl ester hydrochloride, M.P. 187.5–188. °C.

EXAMPLE 2

Following the procedure of Step B of Example 1 and employing an equivalent amount of the alcohols enumerated below in place of the 1-methyl-4-hydroxypiperidine used therein, there are obtained the products set forth below.

| Alcohol: | Product |
|---|---|
| 1-ethyl-4-hydroxypiperidine | 1-ethyl-4-piperidyl ester. |
| 1-propyl-4-hydroxypiperidine | 1-propyl-4-piperidyl ester. |
| 1-isopropyl-4-hydroxypiperidine | 1-isopropyl-4-piperidyl ester. |
| 1-butyl-4-hydroxypiperidine | 1-butyl-4-piperidyl ester. |

What is claimed is:
1. α-(p-Chlorophenoxy)isobutyric acid 1-lower alkyl-4-piperidyl ester.
2. A non-toxic acid addition salt of a compound defined by claim 1.
3. α - (p - Chlorophenoxy)isobutyric acid 1-methyl-4-piperidyl ester.
4. α - (p - Chlorophenoxy)isobutyric acid 1-methyl-4-piperidyl ester hydrochloride.

References Cited

Thuillier et al.: Bull. Soc. Chim. France (1960), pp. 1786–9.
Abstract, Chemical Abstracts, vol. 55, p. 18,898.

JOHN D. RANDOLPH, *Primary Examiner.*

U.S. Cl. X.R.

260—473, 544; 424—267